No. 844,021. PATENTED FEB. 12, 1907.
I. B. HOGAN.
SKIRT SUPPORT AND BLOUSE STAY.
APPLICATION FILED JUNE 17, 1905.
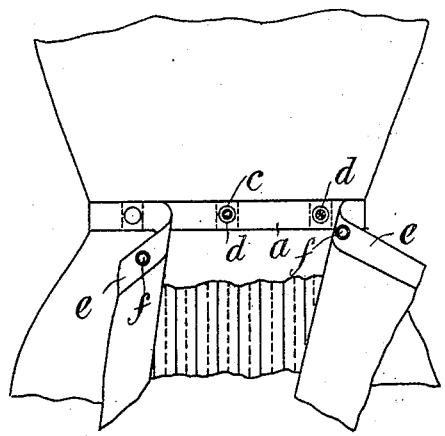
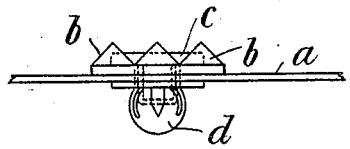
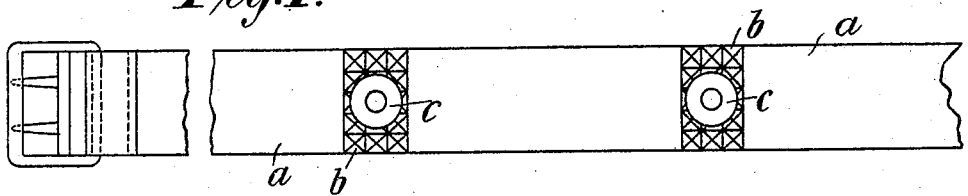
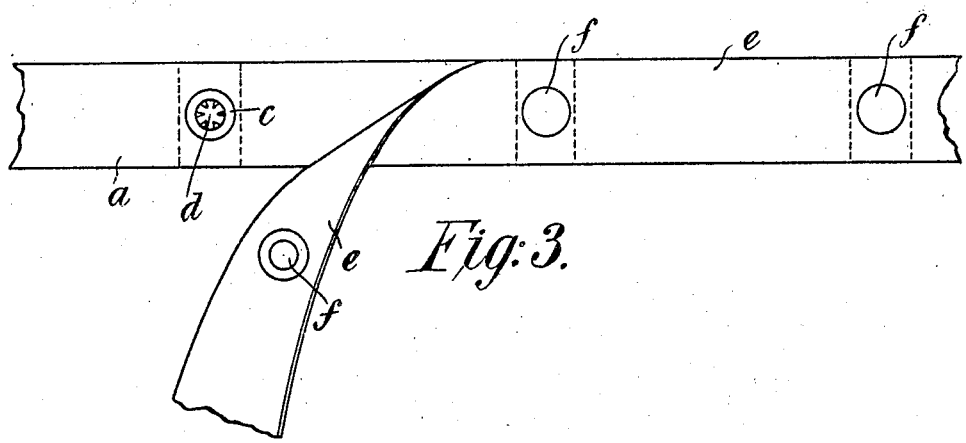
Witnesses
Edwin D. Bartlett
Arthur J. Stephens
Inventor
Inez Belle Hogan
per H. Sefton Jones
Attorney

UNITED STATES PATENT OFFICE.

INEZ BELLE HOGAN, OF LONDON, ENGLAND.

SKIRT-SUPPORT AND BLOUSE-STAY.

No. 844,021.   Specification of Letters Patent.   Patented Feb. 12, 1907.

Application filed June 17, 1905. Serial No. 265,680.

*To all whom it may concern:*

Be it known that I, INEZ BELLE HOGAN, a citizen of the United States of America, residing at St. James Court, 48 Buckingham Gate, in the county of London, England, have invented new and useful Improvements in Skirt-Supports and Blouse-Stays, of which the following is a specification.

My invention relates to a combined skirt-support and blouse stay or grip and consists of a belt of suitable flexible material provided on its inside at intervals with one or more friction-pads of rubber or the like for gripping the blouse, such belt having on its outside one or more studs or projections or their equivalent fixed thereto at intervals intended to engage with eyelets fixed or attached to the inner side of the skirt waistband or binding for supporting it. The studs or projections serve for fastening or attaching the friction or rubber pads to the belt by passing therethrough.

In the accompanying drawings, which illustrate my invention, Figure 1 represents a rear elevation of my improved belt, showing the method of supporting the skirt thereon. Fig. 2 is an enlarged interior view of the belt, showing the friction or rubber pads thereon; and Fig. 3 is an exterior view thereof with the skirt-band in connection. Fig. 4 is a transverse section of the belt at the point where one of the rubber pads is fixed thereto.

Referring to the drawings, *a* is the belt, which may be of canvas, linen, leather, or other convenient fabric or material. Such belt *a* is provided on its inner side with friction-pads *b*, of rubber or other elastic material of uneven surface or of serrated or fluted shape, as shown in the drawings and more clearly seen from Figs. 2 and 4. Such a surface causes a more effective frictional contact to be made between the blouse and the belt and securely grips or holds the former in position, allowing no slipping to take place. The friction-pads *b*, are held in position by central rivets *c* or other fastening means passing through the belt *a*, which rivets are clamped against the said pads below the serrated edges or surfaces *b* and on the outside of the belt *a* such rivets or fastening means may form or be provided with spring-studs or projections *d*. Upon the inner side of the skirt-waistband *e* or supporting-binding or a short strip which may be sewed thereto are fixed or inserted suitable eyelets or recess-buttons *f* at desired intervals adapted to detachably engage with the spring studs or projections *d* and to be supported thereby.

By the use of my improved belt no pins or hooks are necessary, and the blouse is absolutely prevented from slipping up and the skirt from sagging. To fit the same, the belt *a* should be buckled tightly round the blouse with the soft-rubber pads *b* inside. The short strip *e*, with the recess buttons or eyelets *f*, can be sewed on the inside of the skirtband proper at the back of the dress, with the center button *f* in the middle of the waist, so that these buttons can be pressed over the studs *d* on the belt *a*. If the skirt opens at the back instead of the front or side, the strip *e* can be sewed thereon with the skirt closed and thereafter cut at the opening.

It is obvious that, if desired, I could fix the eyelets upon the belt and the studs or projections upon the skirt-band without departing from my invention, although the preferable construction is that shown in the drawings. Further, the belt may be tied around the waist by tape or the like instead of the buckles shown in the drawings.

What I claim is—

In combination the detachable belt *a* the corrugated friction-pads *b* on the inner side of said belt, the rivets *c* adapted to secure the pads to the belt, the spring-studs *d* on said rivets projecting outside said belt *a* and the eyelets *f* adapted to engage with the studs *d* and secured to a garment.

In testimony whereof I have signed my name to this specification in the presence of two subscribing witnesses.

INEZ BELLE HOGAN.

Witnesses:
 GEORGE LEWIS HOGAN,
 ARTHUR J. STEPHENS.